March 5, 1946.  J. R. C. QUILTER ET AL  2,396,126
PARACHUTE PACK
Filed Aug. 4, 1941  2 Sheets-Sheet 2
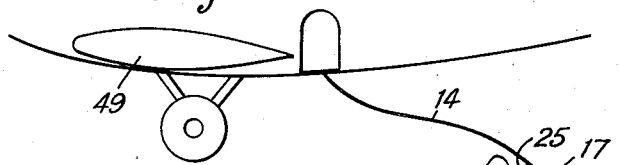
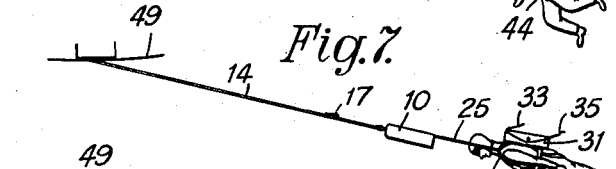
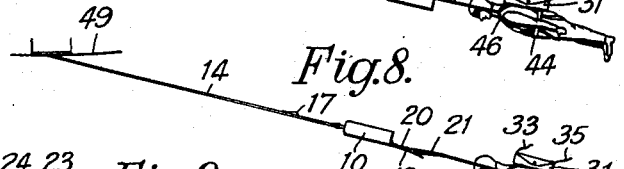
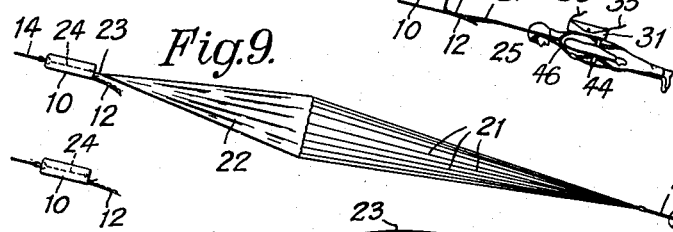
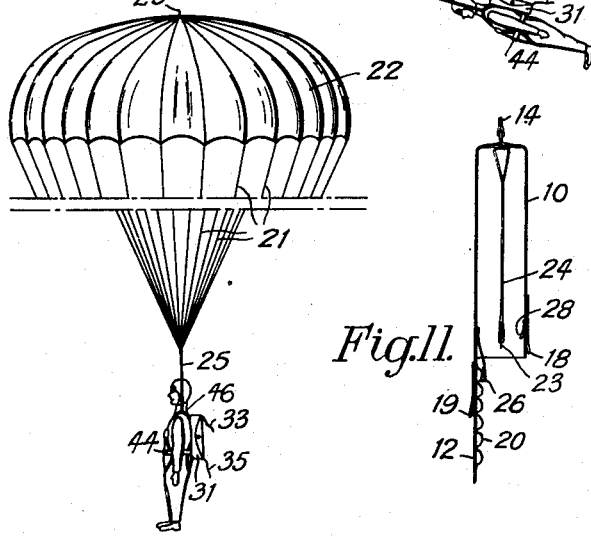
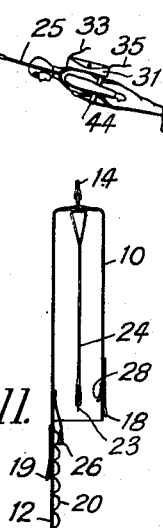

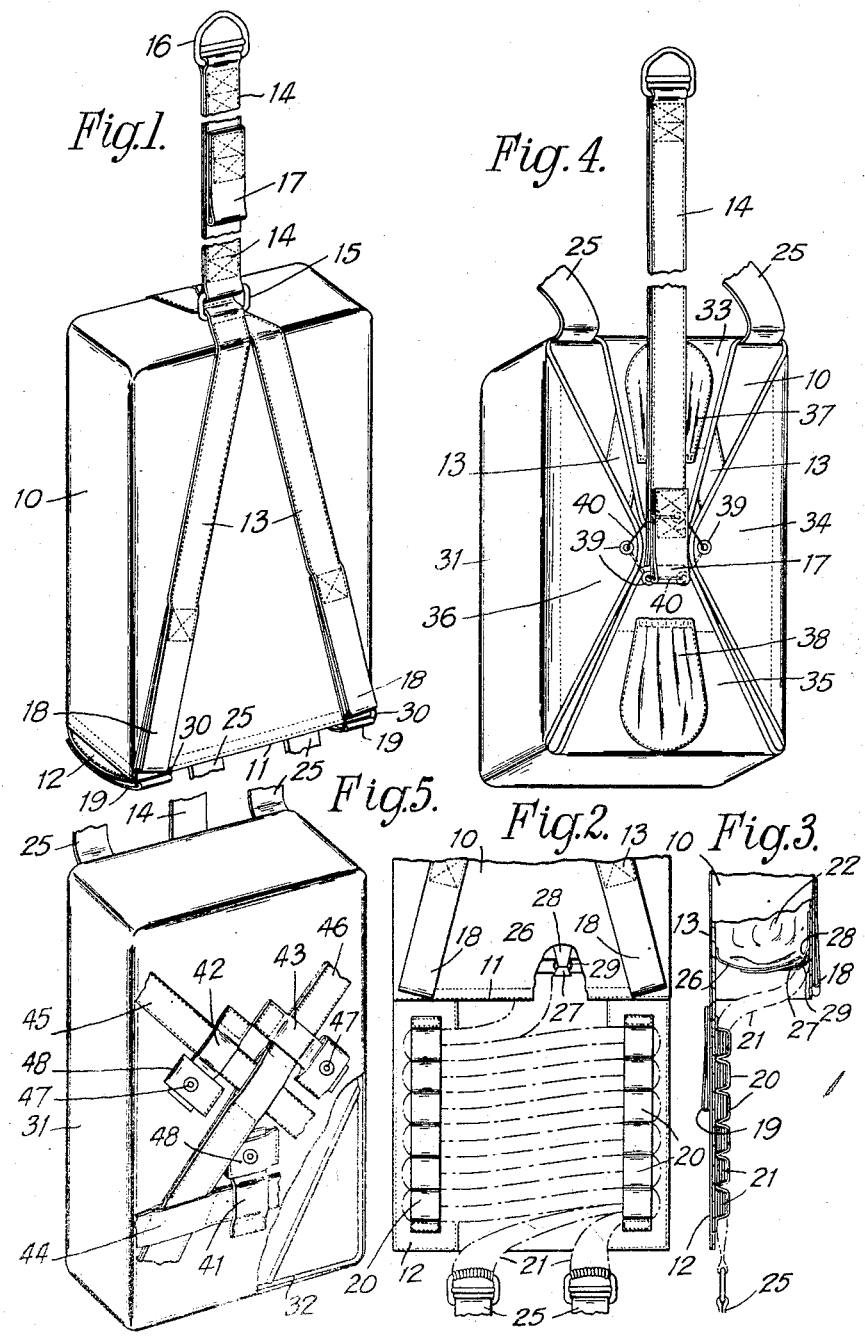

Patented Mar. 5, 1946

2,396,126

UNITED STATES PATENT OFFICE 2,396,126

PARACHUTE PACK

John Raymond Cuthbert Quilter and James Gregory, Woking, England

Application August 4, 1941, Serial No. 405,430
In Great Britain November 20, 1940

9 Claims. (Cl. 244—148)

This invention relates to parachutes of the kind adapted for static release, that is to say, with automatic opening by means of a static line connected to the aircraft from which the parachutist jumps.

The main object of the invention is to provide an improved parachute pack of this kind for use at low altitudes, as in the case of troops landed by parachute from low-flying aircraft, the improved pack affording rapid release of the shroud-lines and controlled deployment of the parachute.

Another object of the invention is to provide a pack which can be conveniently worn by the parachutist, as in the case of ordinary pack parachutes with manual release under the control of the descending parachutist.

A further object of the invention is to provide an improved parachute pack comprising an inner container or satchel and an outer bag, the outer bag being adapted to be secured to the parachutist and the inner container or satchel being secured to the aircraft by means of the static line prior to the jump or take-off; the said inner container is preferably made in the form of an open-ended satchel enclosing the parachute and shroud-lines, with means for ensuring proper deployment of the parachute, while the outer bag comprises a plurality of cover-flaps to facilitate the removal of the satchel from the bag, the various parts being normally kept closed by means of frangible cords which are broken in proper succession by the weight of the parachutist applying tension to the static line.

Other objects and advantages of the invention will hereinafter appear from the following description given with reference to the accompanying drawings, in which:

Fig. 1 represents the parachute-container or satchel, in closed condition.

Fig. 2 is an elevation of the lower end of the container or satchel, in open condition, the cover being unrolled to show the shroud-lines stowed thereon.

Fig. 3 is a side view of the same, partly in section.

Fig. 4 shows the outer bag enclosing the satchel.

Fig. 5 is a corresponding rear view to disclose attachments for connection to the parachutist's harness.

Figs. 6 to 10 are diagrams to illustrate the release of the pack parachute when the wearer jumps from an airplane.

Fig. 11 is a sectional view of the empty satchel.

Referring first to Figs. 1 to 3, the embodiment of the invention illustrated comprises a parachute-container or satchel 10 made of waterproof canvas or like material, this satchel being of substantially rectangular shape but open at one end 11, and being provided at the said end with a cover-flap 12 which can be rolled up into a bundle and stowed in the open end or mouth of the satchel. Two webbing straps 13 extend in V-shape over the front of the satchel and are continued similarly over the back and cover-flap 12, being secured thereto in any convenient manner, as by stitching. A static line or strap 14, also made of webbing or like material, is secured at one end by a shackle 15 to the junction or crossing of the straps 13 at the closed end of the satchel. The other end of the static strap is fitted with a ring or shackle 16 for attachment to the aircraft when in use; at a point near the shackle 15, the strap 14 is formed with a loop 17 for a purpose hereinafter explained.

The ends of the straps 13 on the front of the satchel are formed into loops 18. Near the other ends of these straps, upon the back of the cover-flap 12, there are provided similar loops 19, the two pairs of loops 18—19 being brought into contiguity, as seen in Fig. 1, when the cover-flap is rolled up. The inner face of the cover-flap is provided with parallel lengths of elastic cords or tapes 20, running along the side edges of the flap; these cords form series of loops, within which the parachute shroud-lines 21 are disposed transversely in zigzag lines, as indicated in Fig. 2, which shows the cover unrolled to allow the unobstructed release of the shroud-lines. The upper ends of the shroud-lines are attached in the usual way to the periphery of the parachute 22, which is folded for stowage in the interior of the satchel 10, with its apex attached by means of a breaking cord 23 to an anchorage strap 24 secured within the closed end of the satchel, as seen in Fig. 11. The lower ends of the shroud-lines are connected to the lift-straps 25 of the harness worn by the parachutist, in the usual manner.

The satchel 10 is also provided with an inner flap 26, extending across its open end or mouth 11 but at a suitable distance within the satchel, this flap 26 being employed to retain the folded and stowed parachute in place, separate from the cover-flap 12 and shroud-lines 21, and to control the deployment of the parachute when it is drawn out by the shroud-lines upon release; the flap 26 is formed with loops 27 at its free edge, co-operating with similar loops 28 on the interior of the satchel, the respective pairs of loops being fastened together by breaking cords 29 when the flap 26 has been turned up beneath the stowed parachute. The shroud-lines 21 pass out through the space between the pairs of loops 27—28 to engage with their own retaining tapes 20 upon the cover-flap 12, which is then rolled up into a cylindrical bundle occupying the mouth of the satchel and secured by means of breaking cords 30 connecting the pairs of loops 18—19. These cords 30 fasten the whole package tightly together, as seen in Fig. 1, ready for mounting upon the harness, as by means of an outer bag 10 attached to the said harness.

The outer bag 31, as illustrated in Figs. 4 and 5, is of substantially rectangular shape, having a wire frame 32 enclosed by the material of the base, and four approximately triangular flaps 33—34—35—36 extending from the sides of the bag; two opposite flaps 33—35, at top and bottom respectively, are provided with elastic-mouthed pouches 37—38, and the apices of the four flaps are provided with eyelets 39. These eyelets are connected together by a breaking cord 40 after the parachute container or satchel 10 has been placed inside the bag, the four flaps being then drawn tight by means of the breaking cord 40. This cord is threaded through the loop 17 upon the static strap 14, so that when the latter is subjected to sufficient tension it will break the cord 40 and release the flaps 33—34—35—36, thus allowing the satchel 10 to escape from the outer bag; the bag itself will remain attached to the parachutist, being connected to his harness for example by means of three eyeletted tabs 41—42—43 upon the rear or base (see Fig. 5), the tab 41 engaging with the waist-belt 44, the two tabs 42—43 engaging with the shoulder-straps 45—46, and the ends of the tabs being then secured by fixing their eyelets upon studs 47 inside anchorage loops 48 upon the bag.

The static strap 14, shown in Figs. 4 and 5 as extending up vertically from the top of the bag 31, may be housed in the pouches 37—38 until required for use, the strap being folded up and down in zigzag form, with the bunches of loops stowed in the two pouches. The parachutist can then move about unhampered until it becomes necessary to attach the shackle 16 to the aircraft and to draw out the static strap to its full length in readiness for a jump.

The breaking cords 23—29—30—40 are designed to yield to a pull less than a man's weight, for example a breaking load of 100 pounds. Consequently, when the parachutist jumps from the airplane 49 (see Fig. 6) to which the static strap 14 is secured, his weight will be sufficient to break the cord 40 connecting the flaps 33—34—35—36 of the outer bag as soon as the static strap draws taut; there will be a sufficient length (for example, 8 to 10 feet) of the strap left free to allow the parachutist to fall clear of the airplane 49 before any pull is exerted upon the breaking cord 40 by the loop 17 of the static strap. The satchel 10 and lift straps 25 will then be pulled clear of the opened outer bag 31, as seen in Fig. 7, until the parachutist's weight acting through the harness breaks open the transverse closures 18—19—30 of the satchel, thus allowing the bundled cover-flap 12 to unroll, as seen in Fig. 8; the shroud-lines 21 exposed upon the open flap, as seen in Fig. 2, can peel off to their full length from the retaining tapes 20 and then open the inner flap 26 by breaking its transverse closures 27—28—29 so as to draw out the parachute 22 under the control of the said inner flap from the interior of the satchel, as seen in Fig. 9. As soon as the weight comes to bear upon the anchorage strap 24, the breaking cord 23 attached to the apex of the parachute will give way, the canopy then becoming fully deployed, as seen in Fig. 10, and the descent taking place with the desired retarded fall.

Thus the user becomes supported by the parachute within a very short drop after leaving the airplane, the outer bag 31 descending with him, whereas the empty satchel 10 (Fig. 11) remains attached to the airplane by means of the static strap 14, so that it can be drawn up into the airplane out of the way for the next parachutist to descend. In the event of the descent taking place over hostile territory, the construction and arrangement of the satchel will not be revealed by inspection of the abandoned parachute or even by examination of the outer bag cast off from the harness or flying garment.

It will be understood that instead of mounting the outer bag 31 enclosing the satchel or container 10 upon a harness, the bag may be mounted upon a garment such as a flying suit worn by the parachutist, the eyeletted tabs 41—42—43 being so disposed as to engage in a detachable manner with suitable fittings upon the said garment.

By way of example, the loop 17 may be distant from the shackle 16 by about one-fifth of the total length of the strap 14, for example 2 feet 6 inches out of a total length of 12 feet 6 inches.

What we claim is:

1. A parachute pack, comprising a parachute-container, a parachute stowed therein, means for securing a static line to said container, a frangible connection to said container from the canopy of said parachute, a roll-up flap upon said container, means for retaining the parachute shroud-lines upon said flap, and frangible means for retaining said flap in rolled-up condition, said frangible means being breakable for the unrolling of said flap by tension applied to the static line, and said frangible connection being thereafter breakable by tension applied through said shroud-lines when disengaged from the unrolled flap.

2. A parachute pack, comprising a parachute-container, having an open end, a parachute stowed therein, means for securing a static line to the opposite end of said container, said opposite end being at the top of said container when worn on the back of a parachutist, a frangible connection to said container from the canopy of said parachute, a cover for the open end of said container, said cover being at the bottom of said container when worn on the back of a parachutist, means for retaining the parachute shroud-lines upon said cover, said retaining means adapted to yield to tension of said shroud-lines in the open condition of said cover, and frangible means for retaining said cover in closed condition, said frangible means and frangible connection being successively breakable by tension applied to the static line endwise of said container.

3. A parachute pack, comprising a parachute-container having an open end, a parachute stowed therein, means for securing a static line to the opposite end of said container, said opposite end being at the top of said container when worn on the back of a parachutist, a frangible connection to said container from the canopy of said parachute, a flap adjacent to the open end of said container, means for retaining the parachute shroud-lines upon said flap, said flap being adapted for rolling up into a bundle enclosing the main length of said shroud-lines, said bundle being adapted for stowing in the open end of said container, said open end and said bundle being at the bottom of said container when worn on the back of a parachutist, and frangible means for retaining said bundle in stowed position, said frangible means and frangible connection being breakable successively by tension applied to the static line, and the tensioning of said frangible connection being dependent first on the unrolling of said bundle by tension acting endwise of said container and second on the disengagement of said shroud-lines from their retaining means on said flap after the breakage of said frangible means.

4. A parachute-container, means for securing a static line to said container, a frangible connection to said container the canopy of a parachute to be stowed therein, an outer bag adapted to receive said container, said bag including flaps to engage said container, frangible means for retaining said flaps in engagement with said container, means for attaching said bag to a parachutist and means carried by the static line for breaking said frangible means to disengage said container by tension applied to the static line, prior to full extension of said static line, said frangible connection being thereafter breakable when subjected to the tension applied to the static line at the full extension thereof.

5. A parachute-container, means for securing a static line to said container, a frangible connection to said container the canopy of a parachute to be stowed therein, an outer bag adapted to receive said container, said bag including flaps to engage said container, frangible means for retaining said flaps in engagement with said container, the static line including an intermediate loop engaged by said frangible means, and means for attaching said outer bag to a parachutist, the tension applied to the static line by the weight of the parachutist breaking said frangible means to disengage said container from said outer bag prior to full extension of said static line and subsequently breaking said frangible connection at the full extension of said static line.

6. A parachute pack, comprising a parachute-container having an open end, a parachute stowed therein, means for securing a static line to the opposite end of said container, said opposite end being at the top of said container when worn on the back of a parachutist, an anchorage within said container, a frangible connection upon said anchorage for the canopy of said parachute, a flap adjacent to the open end of said container, means for retaining the parachute shroud-lines upon said flap, said flap and retained shroud-lines being adapted for rolling up into a bundle for stowing in the open end of said container, said open end and said bundle being at the bottom of said container when worn on the back of a parachutist, and frangible means for retaining said flap in place, said frangible means being breakable for the unrolling of said bundle by tension applied to the static line and acting endwise of said container, and said frangible connection being thereafter breakable by tension applied through said shroud-lines when disengaged from the unrolled flap.

7. A parachute-container, means for securing a static line to said container, a frangible connection for attaching the canopy of a parachute to be stowed in said container, a cover for said container, means for retaining the parachute shroud-lines upon said cover, said retaining means adapted to yield to tension of said shroud-lines in the open condition of said cover, frangible means for retaining said cover in closed condition, an outer bag adapted to receive said container, means for attaching said bag to a parachutist and frangible means for maintaining said bag in closed condition, the static line including means for breaking said frangible maintaining means when tension is applied to said static line, but prior to full extension thereof and said frangible retaining means and frangible connection being thereafter successively breakable by the tension of said static line after the release of said container from said bag and at the full extension of said static line.

8. In a parachute pack, a parachute-container, means for securing a static line to said container, a frangible connection for attaching the canopy of a parachute to be stowed in said container, a roll-up flap upon said container, means for retaining the parachute shroud-lines upon said flap, said retaining means adapted to yield to tension of said shroud-lines in the unrolled condition of said flap, frangible means for retaining said flap in rolled-up condition, an outer bag adapted to receive said container, said bag including flaps to engage said container, means for attaching said bag to a parachutist, frangible means for maintaining said last-mentioned flaps in engagement with said container, and means carried by said last-mentioned flaps for retaining said static line upon said bag until required for use, the static line including means for breaking said frangible maintaining means when tension is applied to said static line, but prior to full extension thereof, and said frangible retaining means and frangible connection being thereafter successively breakable by the tension of said static line after the release of said container from said bag and at full extension of said static line.

9. In a parachute pack, a container adapted to receive a folded parachute, means for securing a static line to said container, an anchorage line within said container, said anchorage line adapted for connection to the dome of the parachute, a roll-up flap attached to said container, means for retaining upon said flap the shroud-lines of a parachute stowed in said container, said retaining means adapted to yield to tension of said shroud-lines in the unrolled condition of said flap, an outer bag adapted to receive said container, means for attaching said bag to a parachutist, means for maintaining said bag in closed condition, and means carried by the static line for opening said bag to release said container prior to full extension of said static line, the tension applied to the static line by the weight of the parachutist subsequently unrolling said flap, withdrawing said shroud-lines from said flap and pulling the parachute out of said container at the full extension of said static line.

JOHN RAYMOND CUTHBERT QUILTER.
JAMES GREGORY.